United States Patent
Lee et al.

(10) Patent No.: US 11,380,487 B2
(45) Date of Patent: Jul. 5, 2022

(54) MULTILAYER CERAMIC CAPACITOR

(71) Applicant: SAMSUNG ELECTRO-MECHANICS CO., LTD., Suwon-si (KR)

(72) Inventors: Min Gon Lee, Suwon-si (KR); Taek Jung Lee, Suwon-si (KR); Jin Man Jung, Suwon-si (KR); Ji Hong Jo, Suwon-si (KR); Jin Kyung Joo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 67 days.

(21) Appl. No.: 16/812,900

(22) Filed: Mar. 9, 2020

(65) Prior Publication Data

US 2021/0057159 A1 Feb. 25, 2021

(30) Foreign Application Priority Data

Aug. 19, 2019 (KR) .................. 10-2019-0101361

(51) Int. Cl.
*H01G 4/012* (2006.01)
*H01G 4/12* (2006.01)
(Continued)

(52) U.S. Cl.
CPC .............. *H01G 4/30* (2013.01); *H01G 4/012* (2013.01); *H01G 4/1227* (2013.01); *H01G 4/228* (2013.01)

(58) Field of Classification Search
CPC ........ H01G 2/065; H01G 2/06; H01G 4/0085; H01G 4/012; H01G 4/1209; H01G 4/1218;
(Continued)

(56) References Cited

U.S. PATENT DOCUMENTS

2012/0039016 A1* 2/2012 Togashi .................. H01G 4/35
361/302
2018/0068796 A1* 3/2018 Seo ........................ H01G 4/005
(Continued)

FOREIGN PATENT DOCUMENTS

JP 2011-165776 A 8/2011
KR 10-2018-0027253 A 3/2018
(Continued)

OTHER PUBLICATIONS

Korean Office Action dated Oct. 6, 2020 issued in Korean Patent Application No. 10-2019-0101361 (with English translation).

*Primary Examiner* — Timothy J Thompson
*Assistant Examiner* — Guillermo J Egoavil
(74) *Attorney, Agent, or Firm* — Morgan, Lewis & Bockius LLP

(57) ABSTRACT

A multilayer ceramic capacitor includes a body including a dielectric layer and first and second internal electrodes disposed with the dielectric layer interposed therebetween; first and second connection electrodes penetrating the body in a direction perpendicular to the dielectric layer and connected to the first internal electrode; third and fourth connection electrodes penetrating the body in a in a direction perpendicular to the dielectric layer and connected to the second internal electrode; first and second external electrodes disposed on both surfaces of the body, and connected to the first and second connection electrodes; and third and fourth external electrodes connected to the third and fourth connection electrodes, and at least a portion of the first and second connection electrodes is exposed to the surface of the body.

36 Claims, 9 Drawing Sheets

(51) Int. Cl.
*H01G 4/228* (2006.01)
*H01G 4/30* (2006.01)

(58) Field of Classification Search
CPC ...... H01G 4/1227; H01G 4/224; H01G 4/228;
H01G 4/232; H01G 4/2325; H01G 4/30;
H01G 4/12; H01G 4/008; H01G 4/236;
H01G 4/248; H01G 4/252; H01G 4/385;
H01G 4/35
USPC ......... 361/301.4, 306.3, 321.4, 321.2, 321.5;
174/260
See application file for complete search history.

(56) References Cited

U.S. PATENT DOCUMENTS

| | | |
|---|---|---|
| 2018/0090275 A1 | 3/2018 | Lee et al. |
| 2018/0108483 A1* | 4/2018 | Sasabayashi .......... H01G 4/248 |
| 2018/0122575 A1 | 5/2018 | Jang et al. |
| 2018/0233287 A1* | 8/2018 | Seo ....................... H01G 4/012 |
| 2019/0074138 A1 | 3/2019 | Song et al. |
| 2019/0096577 A1 | 3/2019 | Uenishi et al. |

FOREIGN PATENT DOCUMENTS

| | | | |
|---|---|---|---|
| KR | 10-2018-0033710 A | 4/2018 | |
| KR | 10-2018-0047888 A | 5/2018 | |
| KR | 10-2018-0068911 A | 6/2018 | |
| KR | 20180068911 A * | 6/2018 | ............. H01G 2/065 |
| KR | 10-2019-0027452 A | 3/2019 | |
| KR | 10-2019-0036479 A | 4/2019 | |

\* cited by examiner

MULTILAYER CERAMIC CAPACITOR

CROSS-REFERENCE TO RELATED APPLICATION(S)

This application claims the benefit of priority to Korean Patent Application No. 10-2019-0101361 filed on Aug. 19, 2019 in the Korean Intellectual Property Office, the disclosure of which is incorporated herein by reference in its entirety.

TECHNICAL FIELD

The present disclosure relates to a multilayer ceramic capacitor.

BACKGROUND

Electronic devices including a multilayer ceramic capacitor (MLCC) have recently been increasingly used. A greater number of capacitors have been used in smartphones in the 5th generation era, and such capacitors are required to have high capacity. A mounting area of a passive component such as an MLCC and an inductor, however, has decreased as a size of a set product has been reduced, and accordingly, there has been increasing demand for reducing a size of a passive component. In accordance with the demand, an MLCC and an inductor may be packaged with an IC and an AP, may be embedded in a substrate, or may be mounted on a lower end of an AP in a LSC manner to improve mounting flexibility.

Accordingly, a mounting area may decrease, and ESL occurring in a substrate may also decrease. Thus, there has been increasing demand for an MLCC product having a reduced thickness.

A dual via type capacitor includes a through-hole differently from a general MLCC. In a dual via type capacitor, a cover layer may be disposed in upper and lower portions, a through-hole may be formed in a body in which an active layer forming capacitance is disposed, the through-hole may be filled with a via electrode, and the via electrode may be connected to an external electrode.

In such a via type capacitor, a via may affect ESL and ESR of the capacitor, and capacitance may decrease due to a via. Also, when a gap between vias is narrow, shorts may easily occur, which may be a problem.

SUMMARY

An aspect of the present disclosure is to provide a multilayer ceramic capacitor having a reduced ESL value.

Another aspect of the present disclosure is to provide a multilayer ceramic capacitor having improved mounting properties.

Another aspect of the present disclosure is to provide a multilayer ceramic capacitor which may prevent shorts when the capacitor is mounted on a substrate.

According to an aspect of the present disclosure, a multilayer ceramic capacitor is provided, the multilayer ceramic capacitor including a body including a dielectric layer and first and second internal electrodes disposed with the dielectric layer interposed therebetween, and having a first surface and a second surface opposing each other in a third direction, a third surface and a fourth surface opposing each other in a second direction, and a fifth surface and a sixth surface opposing each other in a first direction; first and second connection electrodes penetrating the body in a direction perpendicular to the dielectric layer and connected to the first internal electrode; third and fourth connection electrodes penetrating the body in a in a direction perpendicular to the dielectric layer and connected to the second internal electrode; first and second external electrodes disposed on first and second surfaces of the body, and connected to the first and second connection electrodes; and third and fourth external electrodes spaced apart from the first and second external electrodes, and connected to the third and fourth connection electrodes, and at least a portion of the first and second connection electrodes is exposed to the first surface or the second surface of the body.

BRIEF DESCRIPTION OF DRAWINGS

The above and other aspects, features, and advantages of the present disclosure will be more clearly understood from the following detailed description, taken in conjunction with the accompanying drawings, in which:

FIG. 6A is a cross-sectional diagram illustrating a first internal electrode, and FIG. 6B is a cross-sectional diagram illustrating a second internal electrode;

FIG. 7A is a cross-sectional diagram illustrating a first internal electrode, and FIG. 7B is a cross-sectional diagram illustrating a second internal electrode;

DETAILED DESCRIPTION

Figure 1:
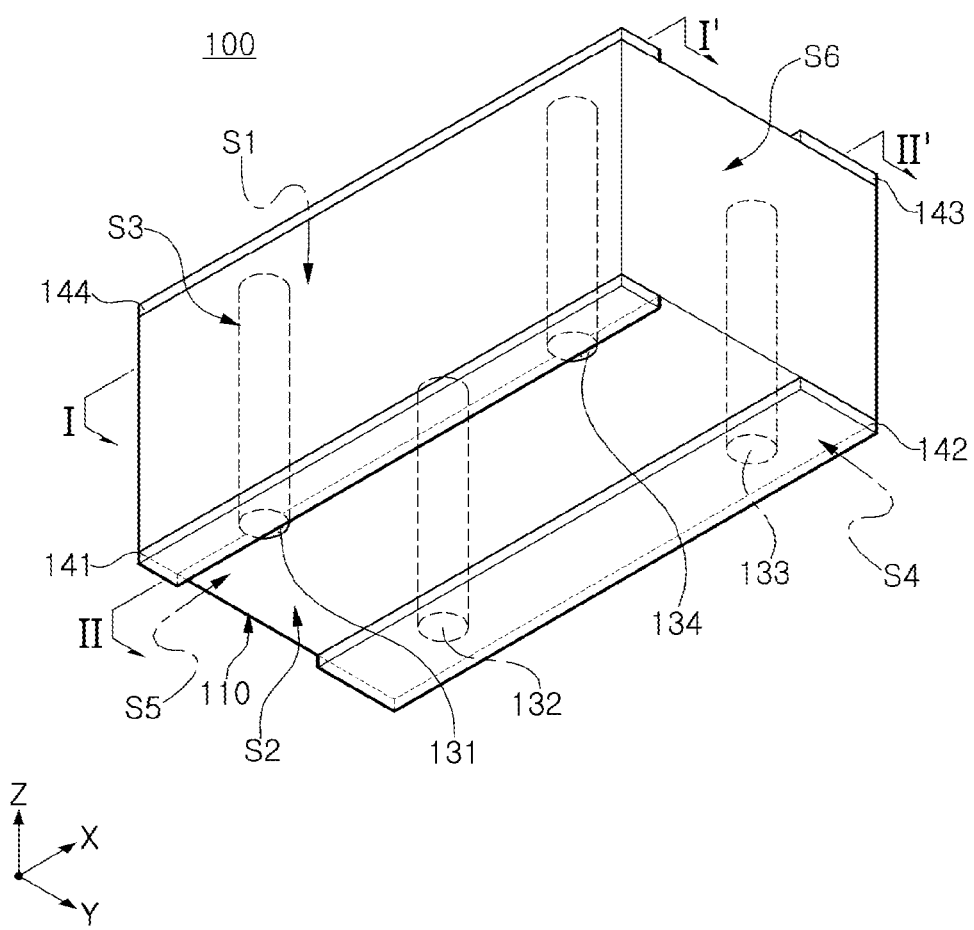
FIG. 1 is a perspective diagram illustrating a multilayer ceramic capacitor according to an example embodiment of the present disclosure.

Hereinafter, embodiments of the present disclosure will be described as follows with reference to the attached drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another example embodiment without departing from the spirit and scope of the present disclosure. Shapes and sizes of elements in the drawings may be exaggerated for clarity of description, and the same elements will be indicated by the same reference numerals.

For clarity of description, some elements may be omitted or briefly illustrated, and thicknesses of elements may be magnified to clearly represent layers and regions. It will be understood that when a portion "includes" an element, it can further include another element, not excluding another element, unless otherwise indicated.

In the diagram, an X direction may be defined as a first direction, an L direction, or a length direction, a Y direction may be defined as a second direction, a W direction, or a width direction, and a Z direction may be defined as a third direction, a T direction, or a thickness direction.

Figure 2A:
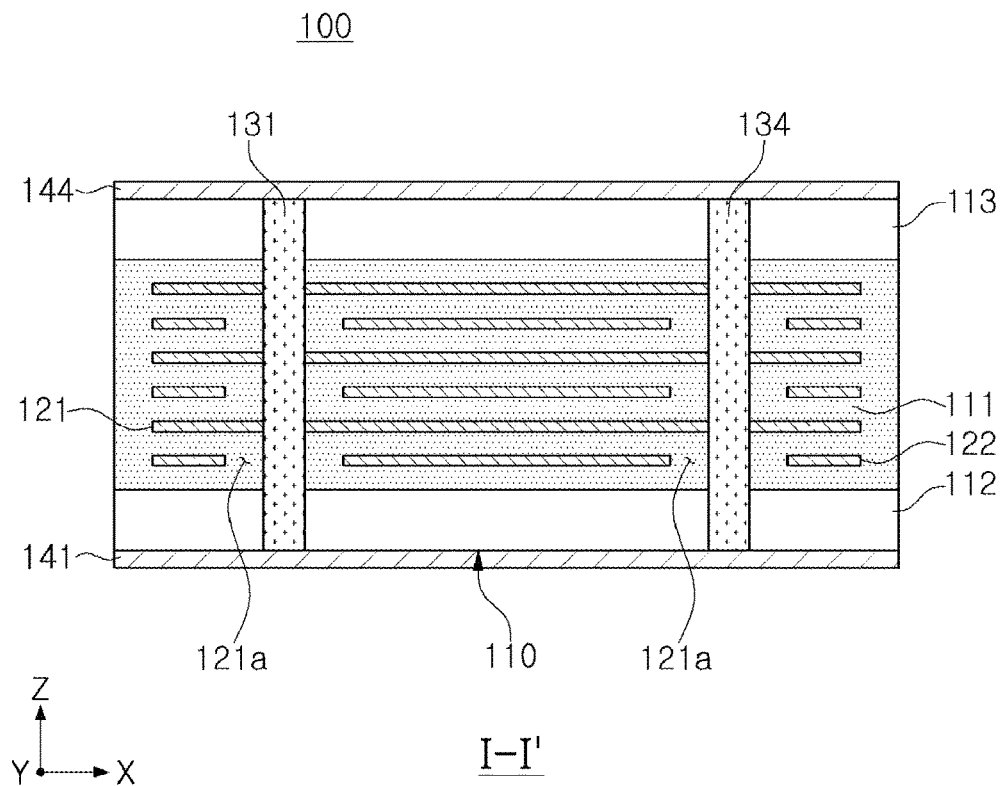
FIGS. 2A and 2B are cross-sectional diagrams taken along line I-I' in FIG. 1.
Figure 2B:
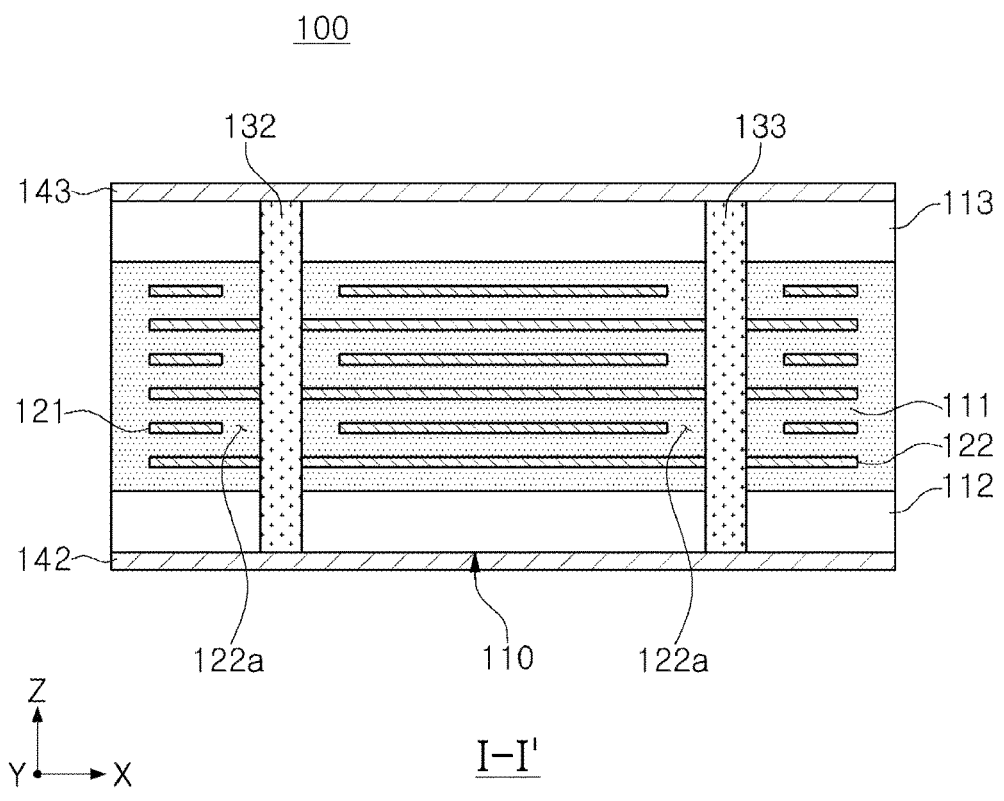
Figure 3:
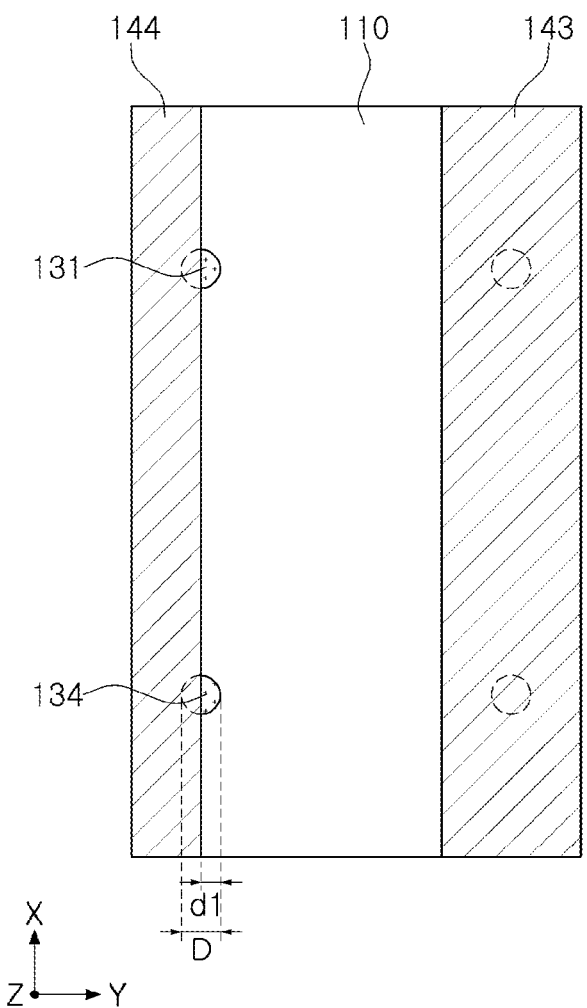
FIG. 3 is a plan diagram illustrating the multilayer ceramic capacitor illustrated in FIG. 1 in an S1 direction.

In the description below, a multilayer ceramic capacitor will be described in accordance with an example embodiment with reference to FIGS. 1 to 3.

A multilayer ceramic capacitor 100 in the example embodiment may include a body 110 including a dielectric layer 111 and first and second internal electrodes 121 and 122 disposed with the dielectric layer 111 interposed therebetween, and having first and second surfaces S1 and S2 opposing each other in a third direction (a Z direction), third and fourth surfaces S3 and S4 opposing each other in a second direction (a Y direction), and fifth and sixth surfaces S5 and S6 opposing each other in a first direction (an X direction); first and second connection electrodes 131 and 134 penetrating the body 110 in a direction perpendicular to the dielectric layer 111 and connected to the first internal electrode 121; third and fourth connection electrodes 132 and 133 penetrating the body 110 in a direction perpendicular to the dielectric layer 111 and connected to the second internal electrode 122; first and second external electrodes 141 and 144 disposed on first and second surfaces of the body 110 and connected to the first and second connection electrodes 131 and 134; and third and fourth external electrodes 142 and 143 spaced apart from the first and second external electrodes 141 and 144 and connected to the third and fourth connection electrodes 132 and 133.

At least a portion of the first and second connection electrodes may be exposed to the first surface or the second surface of the body. The configuration in which a portion of the connection electrode is exposed may indicate that the connection electrode may be viewed externally by the naked eye (or an optical microscope), and may indicate that an area or a width of a portion which is not connected to the external electrode may be greater than 0. The above-described configuration may indicate that a portion of the connection electrode may be exposed, and the other portion may be connected to the external electrode. The portion may correspond to a value converted with reference to a length or an area. When the value is obtained with reference to a length, a ratio of a length of the exposed portion to a diameter of the connection electrode may be within a range of 0.1 to 0.9. When a value is obtained with reference to an area, a ratio of an area of the exposed portion to a length of a cross-sectional surface of the connection electrode may be within a range of 1% to 99%.

In the body 110, the dielectric layer 111 and the first and second internal electrodes 121 and 122 may be alternately layered. A shape of the body 110 may not be limited to any particular shape, and may have a hexahedral shape or a shape similar to a hexahedron, as illustrated in the diagram. Due to contraction of ceramic powder included in the body 110 during a sintering process, the body 110 may not have an exact hexahedral shape with straight lines, but may have a substantially hexahedral shape.

The body 110 may have the first and second surfaces S1 and S2 opposing each other in a thickness direction (Z direction), the third and fourth surfaces S3 and S4 connected to the first and second surfaces S1 and S2 and opposing each other in a width direction (Y direction), and the fifth and sixth surfaces S5 and S6 connected to the first and second surfaces S1 and S2 and the third and fourth surfaces S3 and S4 and opposing each other in a length direction (X direction). One of the first, second, third, and fourth surfaces S1, S2, S3, and S4 may be selected to be a mounting surface.

The plurality of dielectric layers 111 included in the body 110 may be in a sintered state, and the dielectric layers 111 may be integrated such that it may be difficult to identify boundaries between adjacent dielectric layers 111 without using a scanning electron microscope (SEM).

In the example embodiment, a material of the dielectric layer 111 may not be limited to any particular material as long as sufficient capacitance can be obtained. For example, the dielectric layer 111 may be formed using a barium titanate material, a Perovskite material compound with lead (Pb), a strontium titanate material, or the like. The barium titanate material may include a $BaTiO_3$ based ceramic powder, and an example of the ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), and the like, are partially solidified. As the material of the dielectric layer 111, a barium titanate ($BaTiO_3$) powder, or the like, including various ceramic additives, organic solvents, coupling agents, dispersing agents, and the like, may be used depending on an intended purpose.

First and second cover portions 112 and 113 each having a certain thickness may be formed in a lower portion of a lowermost internal electrode and in an upper portion of an uppermost internal electrode of the body 110. The first and second cover portions 112 and 113 may have the same composition as a composition of the dielectric layer 111, and the first and second cover portions 112 and 113 may be formed by layering at least one or more of dielectric layers which do not include an internal layer in each of an upper portion of an uppermost internal electrode and a lower portion of a lowermost internal electrode of the body 110.

In the example embodiment, a thickness of the body 110 may be 100 μm or less. A thickness of the body 110 may be a vertical distance between the first surface and the second surface, and a lower limit of the thickness is not limited to any particular size. For example, the thickness may be 5 μm. By configuring a thickness of the 110 to be 100 μm or less, the multilayer ceramic capacitor in the example embodiment may be applied to a multilayer ceramic capacitor embedded in a substrate and/or a capacitor mounted on a lower end of an AP in LSC type.

The internal electrodes may include the first and second internal electrodes 121 and 122 alternately disposed with the dielectric layer 111 interposed therebetween and opposing each other. The first and second internal electrodes 121 and 122 may include regions 122a and 121a in which an electrode is not disposed, respectively. The regions 121a and 122a in which an electrode is not disposed may refer to regions in which the second and first internal electrodes 122 and 121 are not disposed, respectively, and may allow the first and second internal electrodes 121 and 122 to be connected to different polarities. Accordingly, the first and second connection electrodes 131 and 134 may penetrate the region 121a in which an electrode is not disposed and may be spaced apart from the second internal electrode 122, and the third and fourth connection electrodes 132 and 133 may penetrate the region 122a in which an electrode is not disposed and may be spaced apart from the first internal electrode 121.

As the first and second internal electrodes 121 and 122 may be connected to the first to fourth external electrodes 141, 142, 143, and 144 by the first to fourth connection electrodes 131, 132, 133, and 134, respectively, an area of overlap between the first and second internal electrodes 121 and 122 disposed with the dielectric layer 111 interposed therebetween may increase, and accordingly, capacitance of the multilayer ceramic capacitor 100 may significantly increase. Also, a current loop may be reduced such that ESL may be implemented.

Figure 6A:
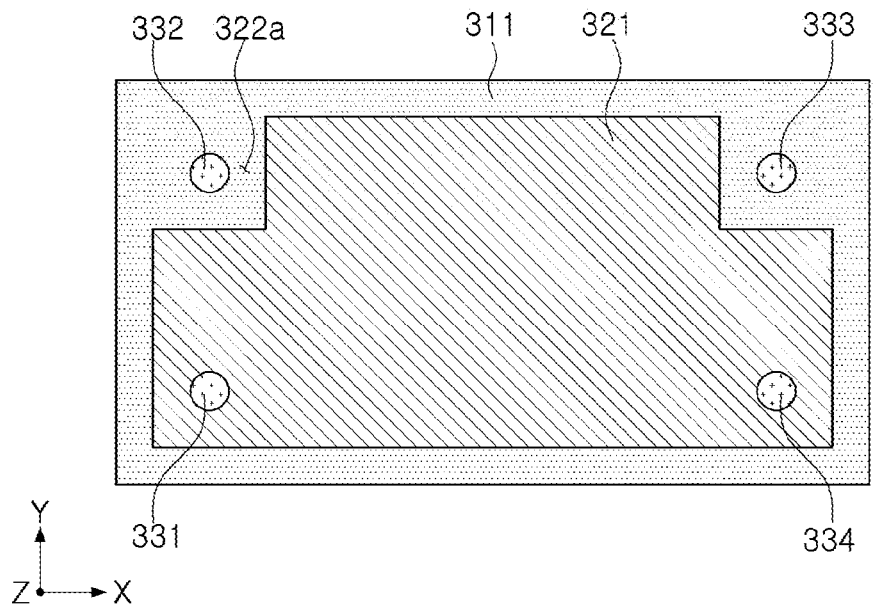
FIGS. 6A and 6B are cross-sectional diagrams taken in an X direction and a Y direction in FIG. 4.
Figure 6B:
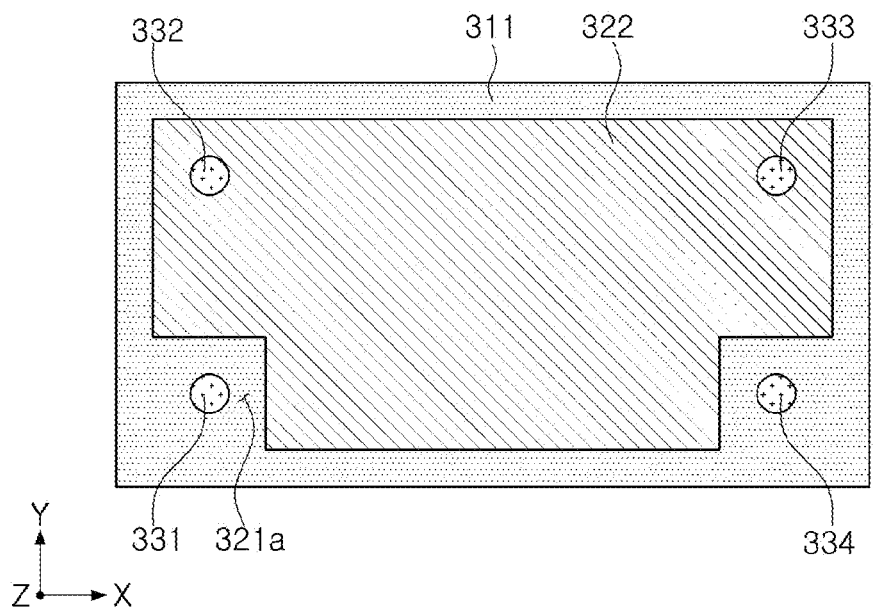

FIGS. 6A and 6B are diagrams illustrating a shape of each of a first internal electrode 321 and a second internal electrode 322. Referring to FIGS. 6A and 6B, the first internal electrode 321 and a second internal electrode 322 may be disposed in point-symmetry with each other. The configuration in which the internal electrodes 321 and 322 are disposed in point-symmetry with each other may indicate that the first internal electrode 321 and the second internal electrode 322 are disposed in point-symmetry with each other with reference to a central point of the internal electrodes 321 and 322 when an conceptual line is drawn under the assumption that an electrode is actually disposed in the regions of the internal electrodes 321 and 322 in which an electrode is not supposed to be disposed. As the first internal electrode 321 and the second internal electrode 322 are disposed in point-symmetry with each other, mutual inductance may be offset effectively, thereby improving equivalent series inductance (ESL) of the multilayer ceramic capacitor.

In the example embodiment, each of the first internal electrode 321 and the second internal electrode 322 may have a T-shaped form. Referring to FIGS. 6A and 6B, each of the first internal electrode 321 and the second internal electrode 322 may have a long side in a length direction and a short side in a width direction, and each of the forms illustrated in FIGS. 6A and 6B may be represented as a T-shaped form.

As each of the first internal electrode 321 and the second internal electrode 322 has a T-shaped form, regions 321a and 322a in which an electrode is not disposed may be formed in the internal electrodes 322 and 321, and accordingly, the regions 321a and 322a in which an electrode is not disposed may be disposed in outer regions of the internal electrodes 322 and 321, and connection electrodes 331, 332, 333, and 334 may penetrate the regions 321a and 322a in which an electrode is not disposed. By the above-described configuration, capacitance may increase as compared to a structure in which a via hole is formed on an internal electrode.

In an example embodiment, each of the regions 321a and 322a of the internal electrodes 321 and 322 in which an electrode is not disposed may have a rectangular shape. Referring to FIGS. 6A and 6B, each of the regions 321a and 322a in which an electrode is not disposed may have a rectangular shape towards centers of the internal electrodes, respectively.

Figure 7A:
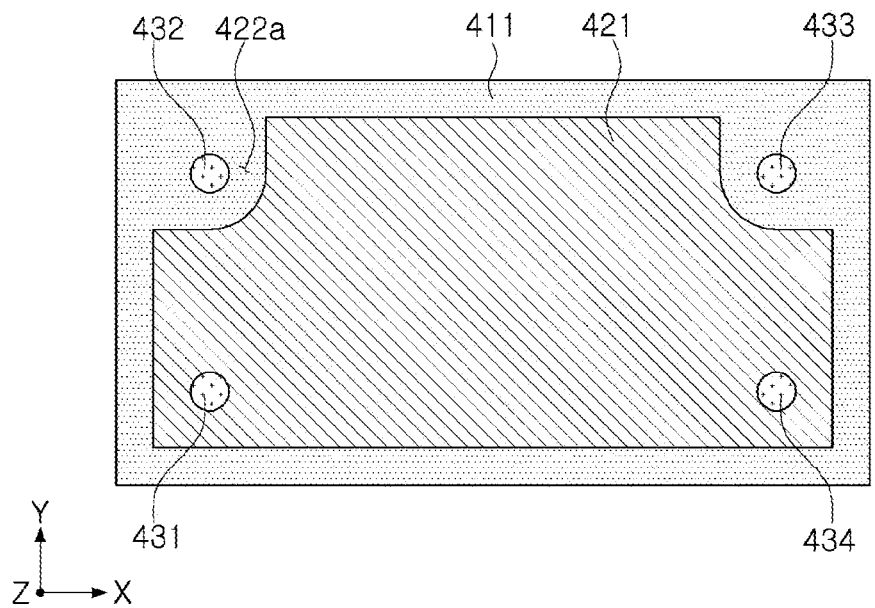
FIGS. 7A and 7B are cross-sectional diagrams taken in an X direction and a Y direction in FIG. 4, illustrating a multilayer ceramic capacitor according to another example embodiment of the present disclosure.
Figure 7B:
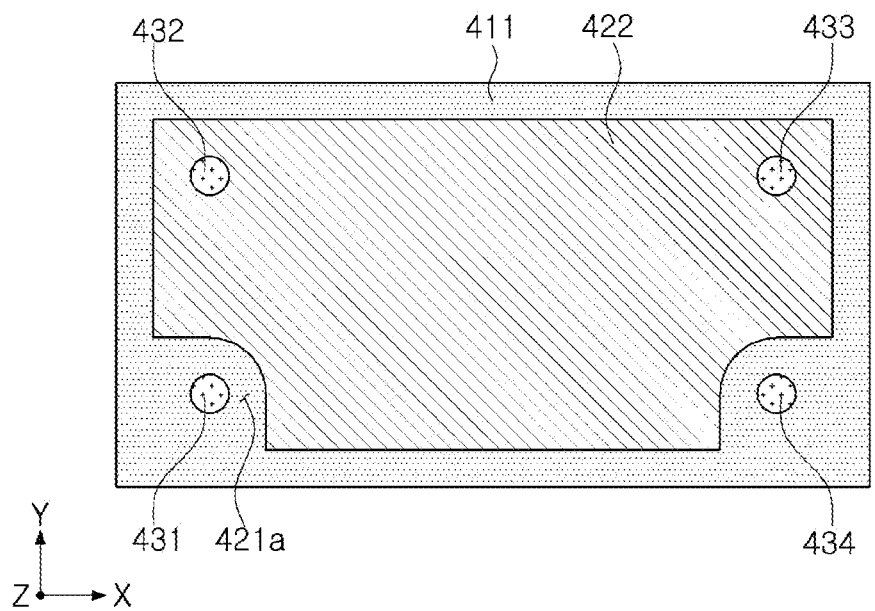

In another example embodiment, each of regions 421a and 422a of the internal electrodes in which an electrode is not disposed may have a rounded shape. Referring to FIGS. 7A and 7B, each of regions 421a and 422a in which an electrode is not disposed may have a rounded shape towards centers of the internal electrodes, respectively.

In the above-described example embodiment, each of the regions in which the internal electrode is not disposed may have a rectangular shape or a rounded shape, but a shape of the internal electrode pattern is not limited thereto. The shape of the internal electrode pattern may include a triangular shape, a polygonal shape, or various other shapes.

The first and second internal electrodes 121 and 122 may include a large amount of nickel (Ni), but a composition of the first and second internal electrodes 121 and 122 is not limited thereto. For example, the first and second internal electrodes 121 and 122 may be formed of a conductive paste including one or more materials from among silver (Ag), palladium (Pd), gold (Au), platinum (Pt), nickel (Ni), tin (Sn), copper (Cu), tungsten (W), titanium (Ti), and alloys thereof. As a method of printing the conductive paste, a screen-printing method, a gravure printing method, or the like, may be used, but the printing method is not limited thereto.

In the example embodiment, at least a portion of the first and second connection electrodes may be configured to be exposed to the first surface or the second surface of the body. FIG. 3 is a plan diagram illustrating a multilayer ceramic capacitor according to an example embodiment. Referring to FIG. 3, at least a portion of the first connection electrode or of the second connection electrode may be exposed to the first surface or the second surface of the body.

In a modified example embodiment, a portion of the first connection electrode and a portion of the second connection electrode may be configured to be exposed to the first surface or the second surface of the body. In this case, as illustrated in FIG. 3, a portion of a surface of each of connection electrodes in contact with an external electrode disposed on one side of the first surface S1 of the body may be exposed through one surface of the body, and a surface of each of connection electrodes in contact with an external electrode disposed on the other side may be configured to be in contact with the external electrode. Also, in the example embodiment, a connection electrode to be exposed may not be disposed on the second surface S2 of the body.

In another modified example embodiment, a portion of the first connection electrode or of the second connection electrode may be configured to be exposed to the first surface and the second surface of the body. In this case, one of the first connection electrode and the second connection electrode may be exposed to both of the first surface and the second surface of the body, and a portion of the connection electrode may be exposed to both of the first surface and the second surface of the body.

In another modified example embodiment, a portion of the first connection electrode and a portion of the second connection electrode may be configured to be exposed to the first surface and the second surface of the body. In this case, the portions of the first connection electrode and the second connection electrode may be exposed through both surfaces of the first surface and the second surfaces of the body.

In the aforementioned example embodiments and FIG. 3, the exposed connection electrodes are described and illustrated with reference to the second external electrode 144, but the example embodiment may also be applied to one or more of the first to fourth external electrodes.

In an example embodiment, a ratio (d1/D) of a length d1 of an exposed portion of an exposed connection electrode of the first connection electrode and the second electrode to a diameter D of the connection electrode may be within a range of 0.1 to 0.9. The ratio (d1/D) may be 0.10 or higher, 0.12 or higher, 0.14 or higher, 0.16 or higher, 0.18 or higher or 0.20 or higher, and may be 0.90 or lower, 0.88 or lower, 0.86 or lower, 0.84 or lower, 0.82 or lower or 0.80 or lower, but an example embodiment thereof is not limited thereto. When the (d1/D) of the length d1 of an exposed portion of an exposed connection electrode of the first connection electrode and the second electrode to the diameter D of the connection electrode is less than the above-mentioned range, shorts may occur when the multilayer ceramic capacitor is mounted on a substrate. When the ratio is higher than the above-mentioned range, connectivity between the connection electrode and the external electrode may be deteriorated. As used herein, the term "diameter" refers to a dimension of the connection electrode in the width or Y direction. Thus, while the cross-section of the connection electrodes is shown to be circular in the embodiments depicted in the figures, other cross-sectional shapes such as, for example, square, rectangle, other regular or irregular convex polygons, ellipse, etc. are contemplated.

Figure 5:
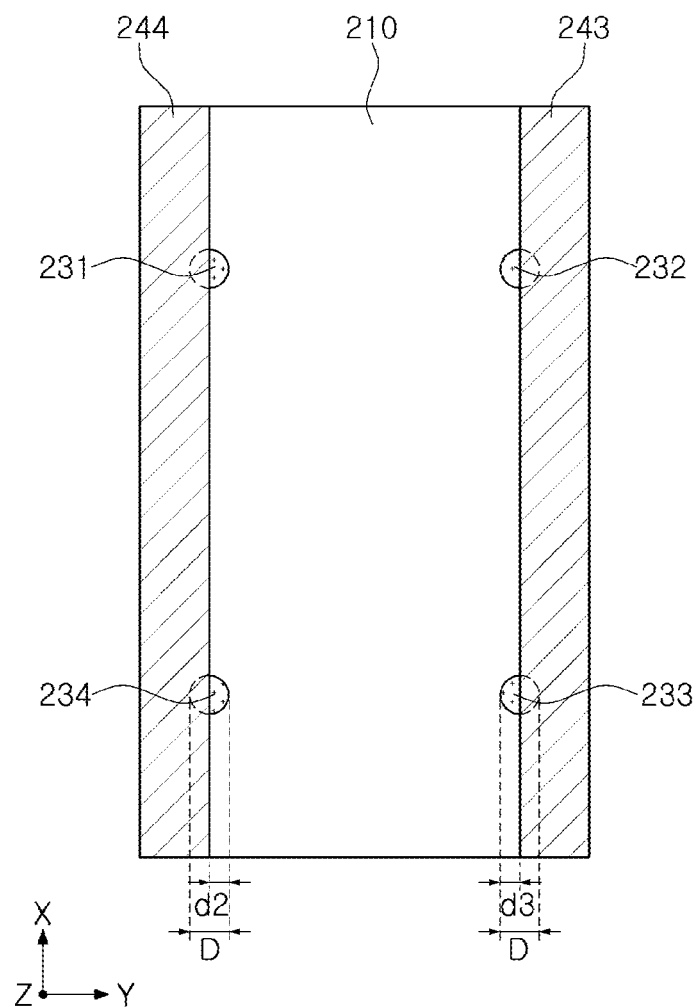
FIG. 5 is a plan diagram illustrating the multilayer ceramic capacitor illustrated in FIG. 4 in an S1 direction.

In another example embodiment, a portion of the third connection electrode or a portion of the fourth connection electrode may be configured to be exposed to the first surface or the second surface of the body. FIG. 5 is a plan diagram illustrating a multilayer ceramic capacitor according to an example embodiment. Referring to FIG. 5, at least a portion of the third connection electrode or the fourth connection electrode may be exposed to the first surface or the second surface of the body.

In a modified example embodiment, a portion of the third connection electrode and a portion of the fourth connection electrode may be exposed to the first surface or the second surface of the body. In this case, as illustrated in FIG. 5, a portions of a surface of each of connection electrodes in contact with an external electrode disposed on one side of the first surface S1 of the body may be exposed through one surface of the body, and a surface of each of connection electrodes in contact with an external electrode disposed on the other side may be in contact with the external electrode. Also, in the example embodiment, the exposed connection electrode may not be disposed on the second surface S2 of the body.

In another modified example embodiment, a portion of the third connection electrode or of the fourth connection electrode may be configured to be exposed to the first surface or the second surface of the body. In this case, one of the third connection electrode and the fourth connection electrode may be exposed to both the first surface and the second surface of the body, and a portion of the connection electrode may be exposed to both the first surface and the second surface of the body.

In another modified example embodiment, a portion of the third connection electrode and a portion of the fourth connection electrode may be configured to be exposed to the first surface and the second surface of the body. In this case, the portions of the third connection electrode and the fourth connection electrodes may be exposed through both surfaces of the first surface and the second surface of the body.

In an example embodiment, a ratio (d3/D) of a length d3 of an exposed portion of an exposed connection electrode of the third connection electrode and the fourth connection electrode to a diameter D of the connection electrode may be within a range of 0.1 to 0.9. The ratio (d3/D) may be 0.10 or higher, 0.12 or higher, 0.14 or higher, 0.16 or higher, 0.18 or higher or 0.20 or higher, and may be 0.90 or lower, 0.88 or lower, 0.86 or lower, 0.84 or lower, 0.82 or lower or 0.80 or lower, but an example embodiment thereof is not limited thereto. When the ratio (d3/D) of the length d3 of an exposed portion of an exposed connection electrode of the third connection electrode and the fourth connection electrode to the diameter D of the connection electrode is less than the above-mentioned range, shorts may occur when the multilayer ceramic capacitor is mounted on a substrate. When the ratio is higher than the above-mentioned range, connectivity between the connection electrode and the external electrode may be deteriorated.

In the example embodiment, the connection electrodes 131, 132, 133, and 134 may include a large amount of nickel (Ni), but a composition of the first and second internal electrodes 121 and 122 is not limited thereto. For example, the connection electrodes 131, 132, 133, and 134 may be formed of a conductive paste including one or more materials from among silver (Ag), palladium (Pd), gold (Au), platinum (Pt), nickel (Ni), tin (Sn), copper (Cu), tungsten (W), titanium (Ti), and alloys thereof. A method of forming the connection electrodes 131, 132, 133, and 134 is not limited to any particular method. For example, the connection electrodes 131, 132, 133, and 134 may be formed by forming a laminate in which the dielectric layer 111, the first internal electrode 121, and the second internal electrode 122 are layered, drilling the body 110 in the third direction (Z direction) using a laser drill, a mechanical pin puncher, and the like, and filling the drilled portion with the above-described conductive paste.

In an example embodiment, the internal electrodes 121 and 122 and the connection electrodes 131, 132, 133, and 134 may include the same metal composition. The same metal material may be nickel (Ni), but an example embodiment thereof is not limited thereto. For example, the metal material may include one or more elements from among silver (Ag), palladium (Pd), gold (Au), platinum (Pt), nickel (Ni), tin (Sn), copper (Cu), tungsten (W), titanium (Ti), and alloys thereof. When the internal electrodes 121 and 122 and the connection electrodes 131, 132, 133, and 134 of the multilayer ceramic capacitor include the same metal composition, sintering initiation temperatures and/or sintering contraction rates of the internal electrodes 121 and 122 and the connection electrodes 131, 132, 133, and 134 may match, such that cracks, delamination, and the like, may be prevented.

In the example embodiment, each of the connection electrodes 131, 132, 133, and 134 may have a rounded shape, but an example of the shape is not limited thereto. Each of the connection electrodes 131, 132, 133, and 134 may have a rectangular shape or a triangular shape. Also, the connection electrodes 131, 132, 133, and 134 may occupy 5 to 65% of an area of the body in the width direction (Y direction), but an example embodiment thereof is not limited thereto.

In the example embodiment, the first to fourth external electrodes 141, 142, 143, and 144 may be disposed on both surfaces of the body 110 opposing each other in a thickness or Z direction. The first and second external electrodes 141 and 144 may be disposed on the first surface S1 and the second surface S2 of the body 110, respectively, and may be connected by the first connection electrode 131 and the second connection electrode 134. The third and fourth external electrodes 142 and 143 may be spaced apart from the first and second external electrodes 141 and 144, may be disposed on the first surface S1 and the second surface S2 of the body 110, respectively, and may be connected by the third connection electrode 132 and the fourth connection electrode 133.

In the multilayer ceramic capacitor 100 having the above-described structure, capacitance of the multilayer ceramic capacitor 100 may improve by increasing a region in which the first and second internal electrodes 121 and 122 are disposed by reducing margin portions of side surfaces connecting an upper surface and a lower surface of the body 100. Thus, the multilayer ceramic capacitor 100 in the example embodiment may have an electrode structure in which an external electrode is not disposed on a side surface, and the internal electrode may be configured to be connected to the external electrode by the connection electrode penetrating the body. Accordingly, capacitance may significantly improve.

In an example embodiment, the external electrodes 141 to 144 and the connection electrodes 131, 132, 133, and 134 may include the same metal composition. The same metal material may be nickel (Ni), but an example embodiment thereof is not limited thereto. For example, the metal material may include one or more elements from among silver (Ag), palladium (Pd), gold (Au), platinum (Pt), nickel (Ni), tin (Sn), copper (Cu), tungsten (W), titanium (Ti), and alloys thereof. When the external electrodes 141 to 144 and the connection electrodes 131, 132, 133, and 134 of the multilayer ceramic capacitor include the same metal composition, the external electrode and the connection electrodes may be simultaneously sintered with the body and the internal electrodes, and sintering initiation temperatures and/or sintering contraction rates of the external electrode, the connection electrodes, the body, and the internal electrodes may match such that cracks, delamination, and the like, may be prevented.

Figure 8:
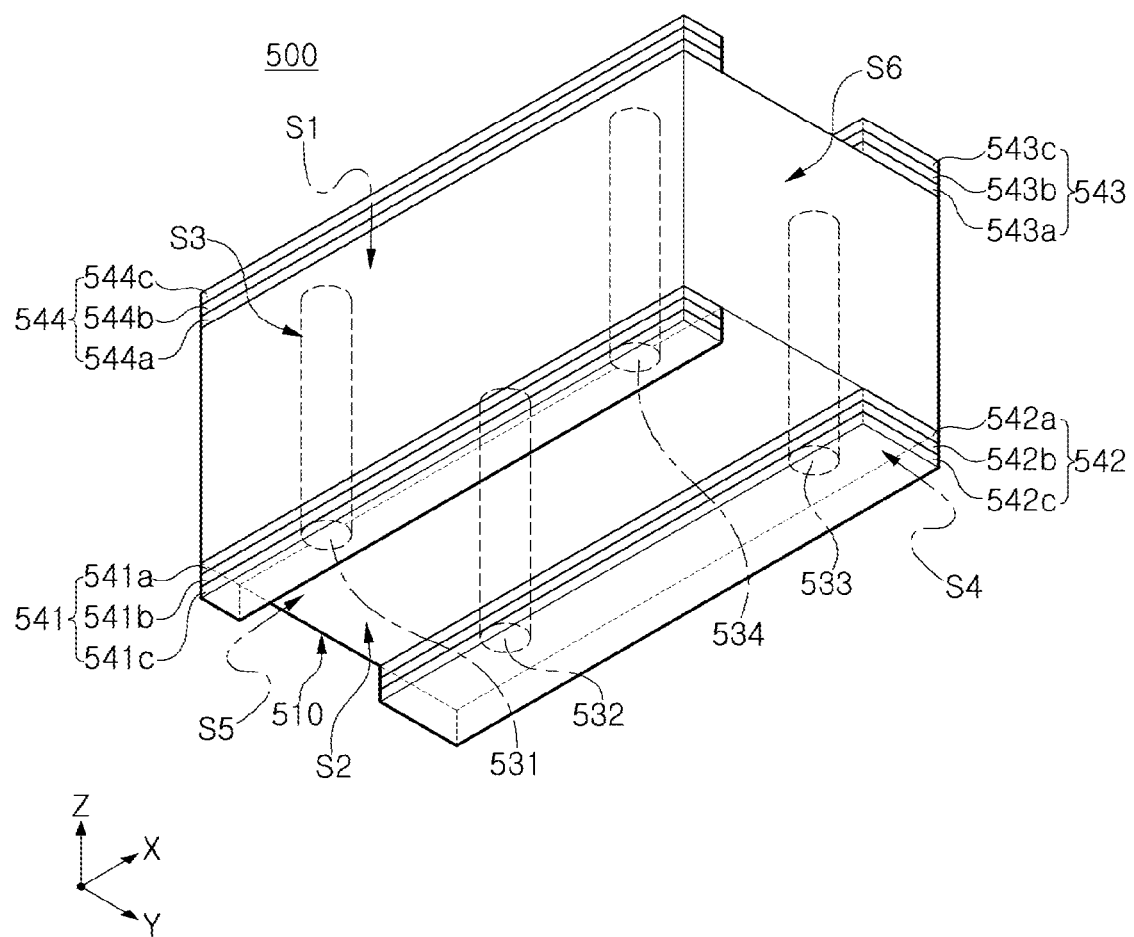
FIG. 8 is a perspective diagram illustrating a multilayer ceramic capacitor according to another example embodiment of the present disclosure.
Figure 9:
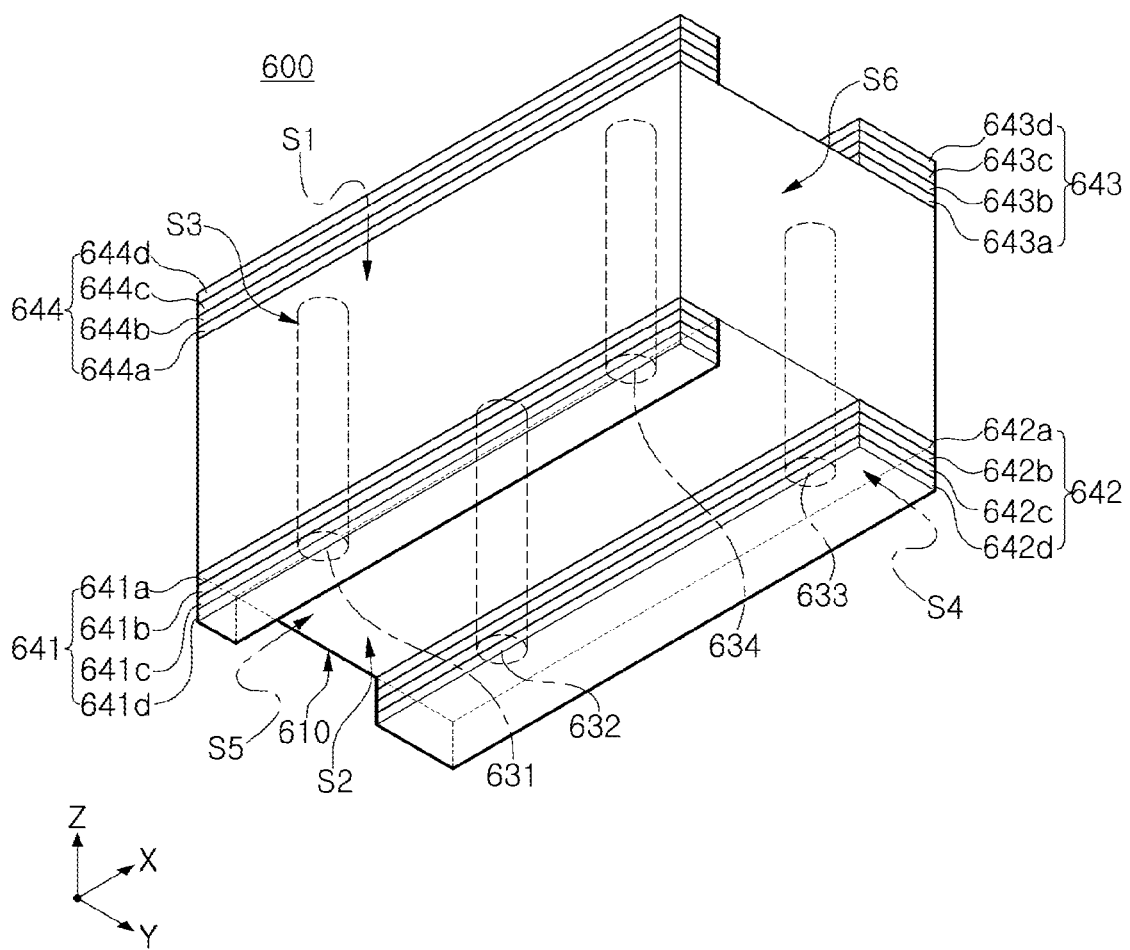
FIG. 9 is a perspective diagram illustrating a multilayer ceramic capacitor according to another example embodiment of the present disclosure.

FIGS. 8 and 9 are perspective diagrams illustrating a multilayer ceramic capacitor according to another example embodiment. In the description below, an example embodiment of a structure of an external electrode will be described with reference to first external electrodes 541 and 641, and the example embodiment may also be applied to the second to fourth external electrodes.

Referring to FIG. 8, the first external electrode 541 may include first and second plating layers 541b and 541c layered in order on a first sintered electrode 541a. The first sintered electrode 541a may be formed by sintering a conductive paste including nickel (Ni). When the external electrode is configured as a sintered electrode as the first sintered electrode 541, the external electrode may be simultaneously sintered with a body and an internal electrode, and cohesion force between the body and the external electrode may improve.

In the example embodiment, the first plating layer 541b may include tin. Generally, as an oxide layer may be formed on a surface of a sintering electrode including nickel, it may be difficult to form the plating layer, a formed plating layer may be easily separated, and other issues may occur. In the multilayer ceramic capacitor in the example embodiment, by disposing the first plating layer 541b including tin, which may have excellent plating properties, on the first plating layer 541a including nickel, the plating layer may be uniformly formed.

The second plating layer 541c may include nickel. The second plating layer 541c including nickel may be applied on the first plating layer 541b including tin, thereby improving strength of the plating layer while maintaining excellent electrical conductivity.

In an example embodiment, the multilayer ceramic capacitor may further include a third plating layer 641d including tin or copper on a second plating layer 641c. Referring to FIG. 9, the third plating layer 641d may be layered on the second plating layer 641c. As the third plating layer 641d includes copper or tin, an external electrode having improved conductivity, plating cohesion properties, and soldering properties may be formed.

In the example embodiment, a thickness of each of the first to fourth external electrodes 141, 142, 143, and 144 may be within a range of 1 μm to 30 μm. A thickness of each of the first to fourth external electrodes 141, 142, 143, and 144 may refer to a total thickness of the sintered electrode and the first to third plating layers, which are layered as described above, and may refer to a vertical distance to a surface of the external electrode from the body. By adjusting a thickness of the external electrode to be within the abovementioned range, when the multilayer ceramic capacitor is mounted on a surface of a substrate or embedded in a substrate, the multilayer ceramic capacitor may not occupy a relatively large space, and the multilayer ceramic capacitor may have improved mounting properties.

In the description below, a method of manufacturing a multilayer ceramic capacitor will be described.

A body including dielectric layers and first and second internal electrodes disposed with the dielectric layer interposed therebetween may be formed by layering a sheet on which a paste including a conductive metal is printed on one surface of a ceramic green sheet including a dielectric layer in certain thickness. A first cover portion and a second cover portion may be formed by layering a dielectric layer which does not include an internal electrode on upper and lower portions of the body.

After forming the cover portions, a via H may be formed in the body using a laser drill, a mechanical pin puncher, or the like. The via H may be coated with a conductive paste, or may be filled with a conductive material through a plating process, or the like, thereby forming first and second through electrodes.

First to fourth external electrodes connected to the first and second through electrodes may be formed on one surface of the body.

For example, the forming the first to fourth external electrodes may include forming first to fourth sintered electrodes including nickel on the body, forming a first plating layer on each of the first to fourth sintered electrodes, forming a second plating layer on the first plating layer, and forming a third plating layer on the second plating layer.

The sintered electrodes may be formed by coating a surface with a conductive paste including nickel and sintering the paste, the first plating layer may include tin and may be formed by an electrical or chemical plating method, and the second plating layer may include nickel and may be formed by an electrical or chemical plating method. The third plating layer may include copper or tin and may be formed by an electrical or chemical plating method.

Figure 4:
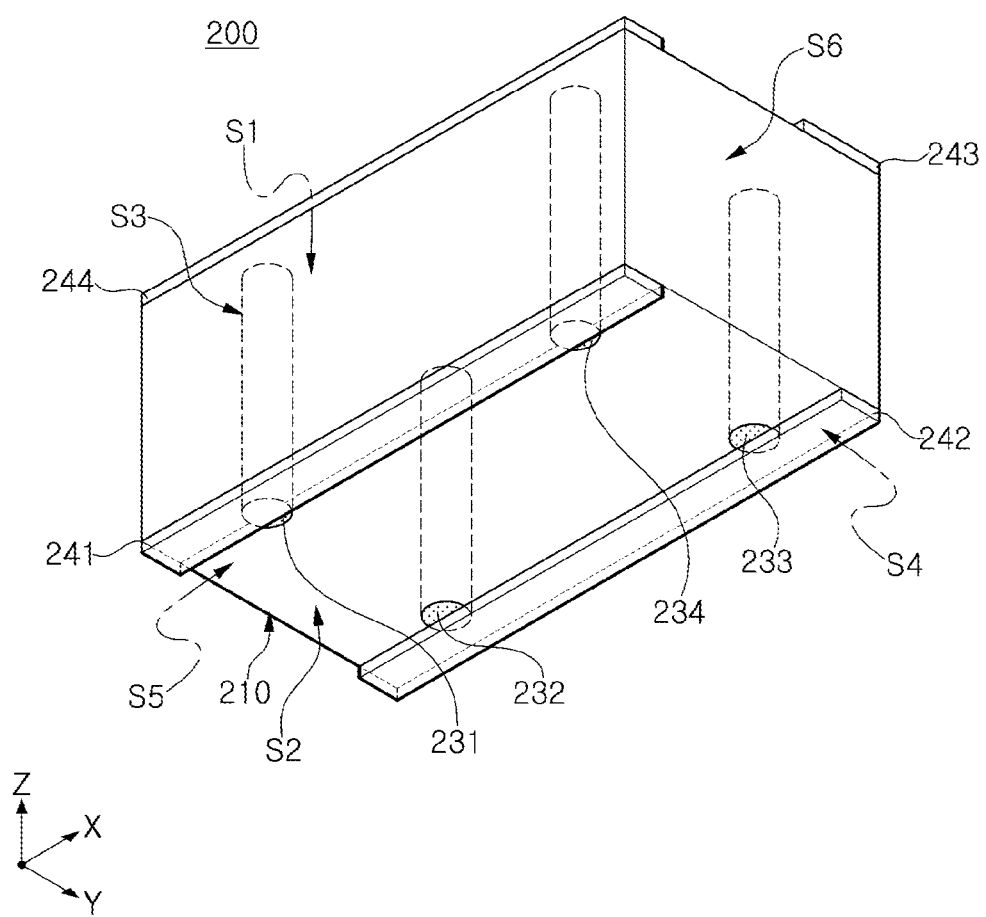
FIG. 4 is a perspective diagram illustrating a multilayer ceramic capacitor according to another example embodiment of the present disclosure.

After forming the sintered electrode layers, a bake-out process and a sintering process may be performed, and the first plating layer and the second plating layer may be formed, thereby manufacturing the multilayer ceramic capacitor illustrated in FIGS. 1 and 4.

According to the aforementioned example embodiments, the multilayer ceramic capacitor having low equivalent series inductance (ESL) may be provided using the connection electrodes penetrating the body.

Also, the multilayer ceramic capacitor may prevent shorts when the multilayer ceramic capacitor is mounted on a substrate.

Further, the low-profile multilayer ceramic capacitor having improved mounting properties may be provided.

While the example embodiments have been shown and described above, it will be apparent to those skilled in the art that modifications and variations could be made without departing from the scope of the present invention as defined by the appended claims.

What is claimed is:
1. A multilayer ceramic capacitor, comprising:
a body including a dielectric layer and first and second internal electrodes disposed with the dielectric layer interposed therebetween, and having a first surface and a second surface opposing each other in a third direc- tion, a third surface and a fourth surface opposing each other in a second direction, and a fifth surface and a sixth surface opposing each other in a first direction;

first and second connection electrodes penetrating the body in a direction perpendicular to the dielectric layer and connected to the first internal electrode;

third and fourth connection electrodes penetrating the body in the direction perpendicular to the dielectric layer and connected to the second internal electrode;

first and second external electrodes disposed on both surfaces of the body opposing each other in the third direction, and connected to the first and second connection electrodes; and third and fourth external electrodes spaced apart from the first and second external electrodes, and connected to the third and fourth connection electrodes, wherein a portion of at least one of the first or second connection electrodes is exposed to at least one of the first surface or the second surface of the body such that a part of said portion is not covered by the first or second external electrode, respectively, and wherein a ratio, d1/D, of a length, d1, of an exposed portion of an exposed connection electrode of the first connection electrode and the second connection electrode to a diameter, D, of the connection electrode is within a range of 0.1 to 0.9.

2. The multilayer ceramic capacitor of claim 1, wherein a portion of the first connection electrode and a portion of the second connection electrode are exposed to the first surface or the second surface of the body.

3. The multilayer ceramic capacitor of claim 1, wherein a portion of the first connection electrode or of the second connection electrode is exposed to the first surface and the second surface of the body.

4. The multilayer ceramic capacitor of claim 1, wherein a portion of the first connection electrode and a portion of the second connection electrode are exposed to the first surface and the second surface of the body.

5. The multilayer ceramic capacitor of claim 1, wherein a portion of either or both of the third connection electrode and a portion of the fourth connection electrode is exposed to the first surface or the second surface of the body.

6. The multilayer ceramic capacitor of claim 5, wherein a portion of the third connection electrode and a portion of the fourth connection electrode are exposed to the first surface or the second surface of the body.

7. The multilayer ceramic capacitor of claim 5, wherein a portion of the third connection electrode or a portion of the fourth connection electrode is exposed to the first surface and the second surface of the body.

8. The multilayer ceramic capacitor of claim 5, wherein a portion of the third connection electrode and a portion of the fourth connection electrode are exposed to the first surface and the second surface of the body.

9. The multilayer ceramic capacitor of claim 5, wherein a ratio, d3/D, of a length, d3, of an exposed portion of an exposed connection electrode of the third connection electrode and the fourth connection electrode to a diameter, D, of the connection electrode is within a range of 0.1 to 0.9.

10. The multilayer ceramic capacitor of claim 1, wherein the internal electrodes and the connection electrodes include the same metal composition.

11. The multilayer ceramic capacitor of claim 1, wherein the connection electrodes and the external electrodes include the same metal composition.

12. The multilayer ceramic capacitor of claim 1, wherein each of the first to fourth external electrodes includes a first plating layer and a second plating layer layered in order on a sintered electrode.

13. The multilayer ceramic capacitor of claim 1,
wherein each of the first and second internal electrodes has a T-shaped form, and the first and second internal electrodes are disposed in point-symmetry with each other,
wherein the first and fourth connection electrodes penetrate a region in which the second internal electrode is not disposed, and
wherein the second and third connection electrodes penetrate a region in which the first internal electrode is not disposed.

14. A multilayer ceramic capacitor, comprising:
a body including first internal electrodes and second internal electrodes disposed in a thickness direction with a dielectric layer interposed between each pair of first and second internal electrodes;
first and second connection electrodes penetrating the body in the thickness direction and connected to the first internal electrodes;
third and fourth connection electrodes penetrating the body in the thickness direction and connected to the second internal electrodes; and
first and second external electrodes, and third and fourth external electrodes spaced apart from the first and second external electrodes, disposed respectively on first and second surfaces of the body opposing each other in the thickness direction such that at least one of the first, second, third or fourth connection electrodes is exposed to at least one of the first or second surfaces of the body such that an exposed portion of the at least one of the first, second, third or fourth connection electrodes is not covered by a corresponding one of the first, second, third or fourth external electrodes,
wherein a ratio, d1/D of a dimension d1 in a width direction of an exposed portion of an exposed connection electrode among the first, second, third and fourth connection electrodes to dimension D in the width direction of the entirety of the exposed connection electrode is in a range from 0.1 to 0.9.

15. A multilayer ceramic capacitor, comprising:
a body including a dielectric layer and first and second internal electrodes disposed with the dielectric layer interposed therebetween, and having a first surface and a second surface opposing each other in a third direction, a third surface and a fourth surface opposing each other in a second direction, and a fifth surface and a sixth surface opposing each other in a first direction;
first and second connection electrodes penetrating the body in a direction perpendicular to the dielectric layer and connected to the first internal electrode;
third and fourth connection electrodes penetrating the body in the direction perpendicular to the dielectric layer and connected to the second internal electrode;
first and second external electrodes disposed on both surfaces of the body opposing each other in the third direction, and connected to the first and second connection electrodes; and
third and fourth external electrodes spaced apart from the first and second external electrodes, and connected to the third and fourth connection electrodes,
wherein a portion of at least one of the first and second connection electrodes is exposed to at least one of the first surface and the second surface of the body, and wherein a ratio, d1/D, of a length, d1, of an exposed portion of an exposed connection electrode of the first connection electrode and the second connection electrode to a diameter, D, of the connection electrode is within a range of 0.1 to 0.9.

16. The multilayer ceramic capacitor of claim 15, wherein a portion of either or both of the third connection electrode and a portion of the fourth connection electrode is exposed to the first surface or the second surface of the body.

17. A multilayer ceramic capacitor, comprising:
a body including first internal electrodes and second internal electrodes disposed in a thickness direction with a dielectric layer interposed between each pair of first and second internal electrodes;
first and second connection electrodes penetrating the body in the thickness direction and connected to the first internal electrodes;
third and fourth connection electrodes penetrating the body in the thickness direction and connected to the second internal electrodes;
first and second external electrodes, and third and fourth external electrodes spaced apart from the first and second external electrodes, disposed respectively on first and second surfaces of the body opposing each other in the thickness direction such that at least one of the first, second, third and fourth connection electrodes is exposed to at least one of the first and second surfaces of the body,
wherein a ratio, d1/D, of a length, d1, of an exposed portion of an exposed connection electrode of the first connection electrode and the second connection electrode to a diameter, D, of the connection electrode is within a range of 0.1 to 0.9.

18. The multilayer ceramic capacitor of claim 17, wherein a ratio, d3/D, of a length, d3, of an exposed portion of an exposed connection electrode of the third connection electrode and the fourth connection electrode to a diameter, D, of the connection electrode is within a range of 0.1 to 0.9.

19. A multilayer ceramic capacitor, comprising:
a body including a dielectric layer and first and second internal electrodes disposed with the dielectric layer interposed therebetween, and having a first surface and a second surface opposing each other in a third direction, a third surface and a fourth surface opposing each other in a second direction, and a fifth surface and a sixth surface opposing each other in a first direction;
first and second connection electrodes penetrating the body in a direction perpendicular to the dielectric layer and connected to the first internal electrode;
third and fourth connection electrodes penetrating the body in the direction perpendicular to the dielectric layer and connected to the second internal electrode;
first and second external electrodes disposed on both surfaces of the body opposing each other in the third direction, and connected to the first and second connection electrodes; and
third and fourth external electrodes spaced apart from the first and second external electrodes, and connected to the third and fourth connection electrodes,
wherein a portion of at least one of the first or second connection electrodes is exposed to at least one of the first surface or the second surface of the body such that a part of said portion is not covered by the first or second external electrode, respectively,
wherein a portion of either or both of the third connection electrode and a portion of the fourth connection electrode is exposed to the first surface or the second surface of the body, and
wherein a ratio, d3/D, of a length, d3, of an exposed portion of an exposed connection electrode of the third connection electrode and the fourth connection electrode to a diameter, D, of the connection electrode is within a range of 0.1 to 0.9.

20. The multilayer ceramic capacitor of claim 19, wherein a portion of the first connection electrode and a portion of the second connection electrode are exposed to the first surface or the second surface of the body.

21. The multilayer ceramic capacitor of claim 19, wherein a portion of the first connection electrode or of the second connection electrode is exposed to the first surface and the second surface of the body.

22. The multilayer ceramic capacitor of claim 19, wherein a portion of the first connection electrode and a portion of the second connection electrode are exposed to the first surface and the second surface of the body.

23. The multilayer ceramic capacitor of claim 19, wherein a portion of the third connection electrode and a portion of the fourth connection electrode are exposed to the first surface or the second surface of the body.

24. The multilayer ceramic capacitor of claim 19, wherein a portion of the third connection electrode or a portion of the fourth connection electrode is exposed to the first surface and the second surface of the body.

25. The multilayer ceramic capacitor of claim 19, wherein a portion of the third connection electrode and a portion of the fourth connection electrode are exposed to the first surface and the second surface of the body.

26. The multilayer ceramic capacitor of claim 19, wherein the internal electrodes and the connection electrodes include the same metal composition.

27. The multilayer ceramic capacitor of claim 19, wherein the connection electrodes and the external electrodes include the same metal composition.

28. The multilayer ceramic capacitor of claim 19, wherein each of the first to fourth external electrodes includes a first plating layer and a second plating layer layered in order on a sintered electrode.

29. The multilayer ceramic capacitor of claim 19, wherein each of the first and second internal electrodes has a T-shaped form, and the first and second internal electrodes are disposed in point-symmetry with each other,
wherein the first and fourth connection electrodes penetrate a region in which the second internal electrode is not disposed, and
wherein the second and third connection electrodes penetrate a region in which the first internal electrode is not disposed.

30. A multilayer ceramic capacitor, comprising:
a body including a dielectric layer and first and second internal electrodes disposed with the dielectric layer interposed therebetween, and having a first surface and a second surface opposing each other in a third direction, a third surface and a fourth surface opposing each other in a second direction, and a fifth surface and a sixth surface opposing each other in a first direction;
first and second connection electrodes penetrating the body in a direction perpendicular to the dielectric layer and connected to the first internal electrode;
third and fourth connection electrodes penetrating the body in the direction perpendicular to the dielectric layer and connected to the second internal electrode;

first and second external electrodes disposed on both surfaces of the body opposing each other in the third direction, and connected to the first and second connection electrodes; and third and fourth external electrodes spaced apart from the first and second external electrodes, and connected to the third and fourth connection electrodes, wherein a portion of at least one of the first or second connection electrodes is exposed to at least one of the first surface or the second surface of the body such that a part of said portion is not covered by the first or second external electrode, respectively, wherein each of the first and second internal electrodes has a T-shaped form, and the first and second internal electrodes are disposed in point-symmetry with each other, wherein the first and fourth connection electrodes penetrate a region in which the second internal electrode is not disposed, and wherein the second and third connection electrodes penetrate a region in which the first internal electrode is not disposed.

31. The multilayer ceramic capacitor of claim 30, wherein a portion of the first connection electrode and a portion of the second connection electrode are exposed to the first surface or the second surface of the body.

32. The multilayer ceramic capacitor of claim 30, wherein a portion of the first connection electrode or of the second connection electrode is exposed to the first surface and the second surface of the body.

33. The multilayer ceramic capacitor of claim 30, wherein a portion of the first connection electrode and a portion of the second connection electrode are exposed to the first surface and the second surface of the body.

34. The multilayer ceramic capacitor of claim 30, wherein the internal electrodes and the connection electrodes include the same metal composition.

35. The multilayer ceramic capacitor of claim 30, wherein the connection electrodes and the external electrodes include the same metal composition.

36. The multilayer ceramic capacitor of claim 30, wherein each of the first to fourth external electrodes includes a first plating layer and a second plating layer layered in order on a sintered electrode.

\* \* \* \* \*